United States Patent [19]

Ducret et al.

[11] 4,106,827

[45] Aug. 15, 1978

[54] BEARING WITH TWO ROWS OF ROLLING ELEMENTS INCLUDING METHOD OF MOUNTING BEARING

[75] Inventors: Alain Ducret, Annecy Levieux; André Maurice Chalesle, Paris, both of France

[73] Assignee: Regie Nationale des Usines Renault, Billancourt, France

[21] Appl. No.: 785,694

[22] Filed: Apr. 7, 1977

[30] Foreign Application Priority Data

Apr. 7, 1976 [FR] France .................................. 76 10061

[51] Int. Cl.² .............................................. F16C 33/76
[52] U.S. Cl. ............................... 308/187.1; 308/189 R
[58] Field of Search ................ 308/189, 207, 190–191, 308/194, 195, 196, 208, 214, 213, 233, 234, 16, 187, 210, 187.1, 187.2; 29/148.4 R, 148.4 A, 148.4 B, 148.4 S, 148.5 R, 724, 725

[56] References Cited

U.S. PATENT DOCUMENTS

| 3,651,550 | 3/1972 | Bennett | 308/196 X |
| 3,819,243 | 6/1974 | Asberg et al. | 308/191 |
| 4,010,986 | 3/1977 | Otto | 308/189 R |

*Primary Examiner*—Trygve M. Blix
*Assistant Examiner*—Douglas C. Butler
*Attorney, Agent, or Firm*—Oblon, Fisher, Spivak, McClelland & Maier

[57] ABSTRACT

A bearing having an outer race, an inner race with a mounting flange formed thereon, two corresponding bearing grooves formed in each of the races, and two sets of rolling elements disposed in parallel relation in the bearing grooves of the inner and outer races and within two holding and guiding cages of the same continuous circular configuration arranged in parallel relation between the inner and outer races. The bearing is formed by mounting one of the cages on the inner race on the side thereof having the mounting flange, placing a first row of the rolling elements in the cage, slipping the outer race over the inner race while holding it slightly inclined and off-center with respect thereto, placing the second row of rolling elements into the corresponding bearing groove while moving the outer race towards a centered position and reducing the inclination thereof, and mounting the second cage.

11 Claims, 14 Drawing Figures

BEARING WITH TWO ROWS OF ROLLING ELEMENTS INCLUDING METHOD OF MOUNTING BEARING

BACKGROUND OF THE INVENTION

1. Field of the Invention

The present invention relates to bearings of the type with inner and outer races and having two rows of rolling elements, the inner race of which has one side prolonged radially outward to provide a shoulder which forms a mounting flange, the bearings comprising two bearing grooves on the inner race and two complementary bearing grooves on the outer race, and two cages for holding and guiding the rolling elements.

2. Description of the Prior Art

Such bearings of the type described hereinbefore are well known. However, the cage holding and guiding the rows of rolling elements is inaccessibly located on the mounting flange side and must be formed in two or more sections if it is desired to mount the two rows of rolling elements in a decentered position with respect to the inner and outer races. Mounting of the bearing is then relatively complicated since a special tool is required, permitting axial introduction of the elements of the roller cage from the side opposite the mounting flange.

SUMMARY OF THE INVENTION

According to the present invention, there is provided for each row of rolling elements an identical cage conveniently made of a plastic material which can be snapped on the various elements of the bearing.

The bearing of the invention can be mounted as follows:

One mounts the cage of the first row of rolling elements on the mounting-bracket side and the rolling elements in the cage. The outer race is then placed around the inner race and held in an off-center position inclined to the plane of the row of rolling elements. Next, the rolling elements of the second row are set in the corresponding groove and distributed while the inclination of the outer race is reduced and the outer race is moved towards a centered position, after which the cage of the second row of rolling elements is set in place.

when the outer race consists of an assembly of two elementary races each having a bearing groove, a slightly different mounting procedure may be used. In this case, one would enclose the inner race carrying the first row of rolling elements and the corresponding cage by a first element of the outer race with the bearing groove for the rolling elements on the side with the shoulder. Next, one encloses the inner race with the second element of the outer race held in an off-center position during introduction of the rolling elements of the second row. The decentering of the second element of the outer race is then reduced and the cage of the second row of rolling elements is set in place. The elements of the outer race would, of course, be fastened together by any known means, such as bolts, rivets, a hoop or brazing.

BRIEF DESCRIPTION OF THE DRAWINGS

Other objects, features and attendant advantages of the present invention will be more fully appreciated as the same becomes better understood from the following detailed description when considered in connection with the accompanying drawings, in which like reference numerals designate like or corresponding parts throughout the several views, and wherein.

DETAILED DESCRIPTION OF THE ILLUSTRATED EMBODIMENTS

Figure 1:
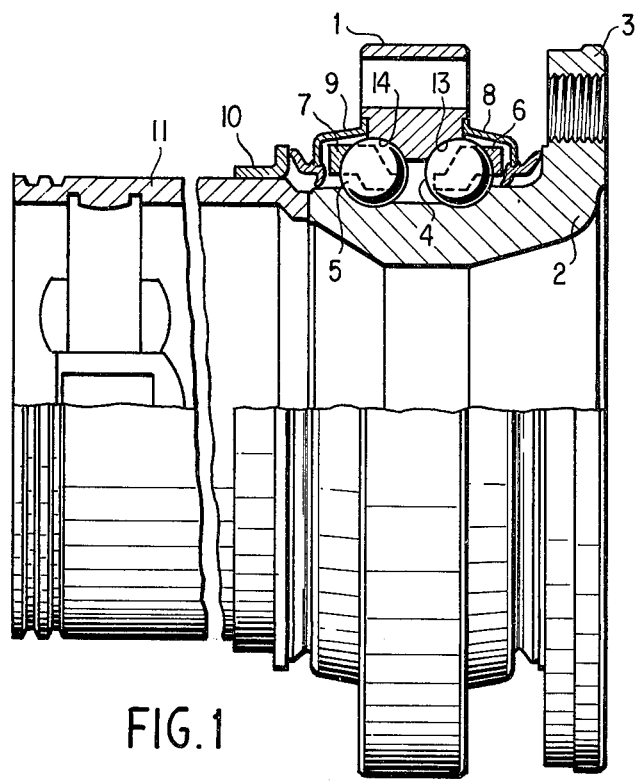
FIG. 1 is a sectional view of a double-row ball bearing in which the balls are set in two identical cages.

Referring now to the drawings, and more particularly to FIG. 1, the double-row ball bearing shown therein comprises an outer race 1, which may be formed in one or two sections, such constituting elementary races, each with a bearing groove, and an inner race 2. The inner race 2 has a shoulder 3 on one side which extends radially outward to form a mounting flange. The rows of balls 4 and 5 disposed between the outer race 1 and the inner race 2 are set in two identical snap-in cages 6 and 7, realized, for instance, as single continuous circular pieces of plastic material.

Figure 13:
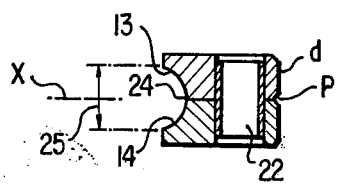
Figure 14:
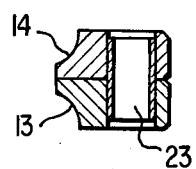

The holding and guiding cages 6 and 7, as well as the rolling elements 4 and 5, are protected by two identical seals 8 and 9, respectively, with two sealing lips, one being radial and one axial. The radial lips press against the inner race 2 and the axial lips press against the shoulder 3 and against a shoulder 10 attached to the driven element 11 of a transmission coupling, not shown. The seals 8 and 9 also extend to and snap into a recess machined into each lateral face of the outer race 1, or of the elementary races, if the same is formed in two sections, near the two bearing grooves 13 and 14. In the latter case, it proves to be particularly advantageous to make the plane P of lateral faces 24 of the elementary races, namely races 1a and 1b, coincide with a plane of symmetry X of the grinding tool for the bearing grooves 13 and 14, as shown in FIG. 13. These may then be ground simultaneously with the same tool, as also indicated in FIG. 13.

Figure 2:
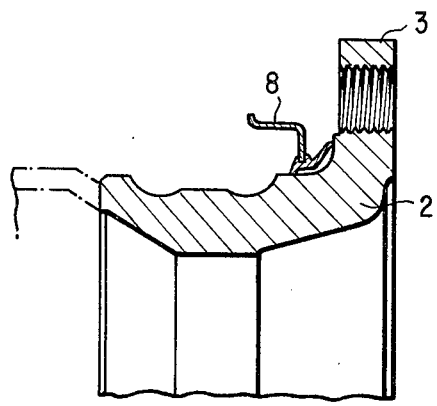
FIGS. 2 to 7 show the different steps in mounting the bearing of FIG. 1.
Figure 3:
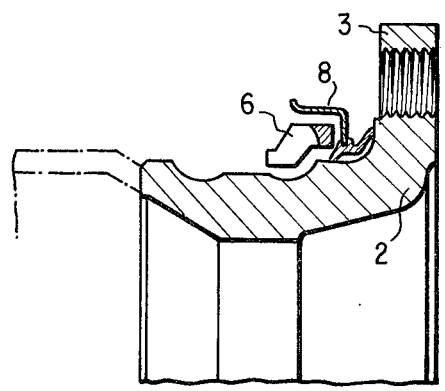
Figure 4:
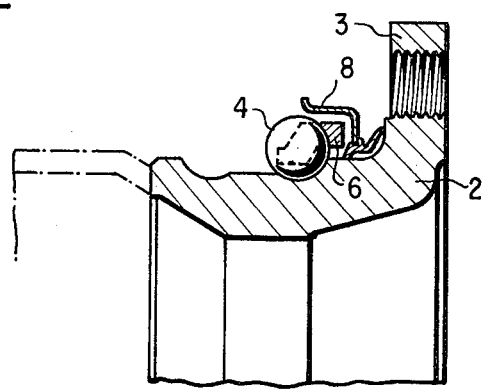

From FIGS. 2 to 7, which illustrate a first mounting procedure, it is seen that one successively puts in place the seal 8 on the inner race 2, as shown in FIG. 2, and the cage 6, as shown in FIG. 3. One next inserts the roller elements of the row 4 of such elements adjacent to the shoulder 3 into the cage 6, as shown in FIG. 4.

Figure 5:
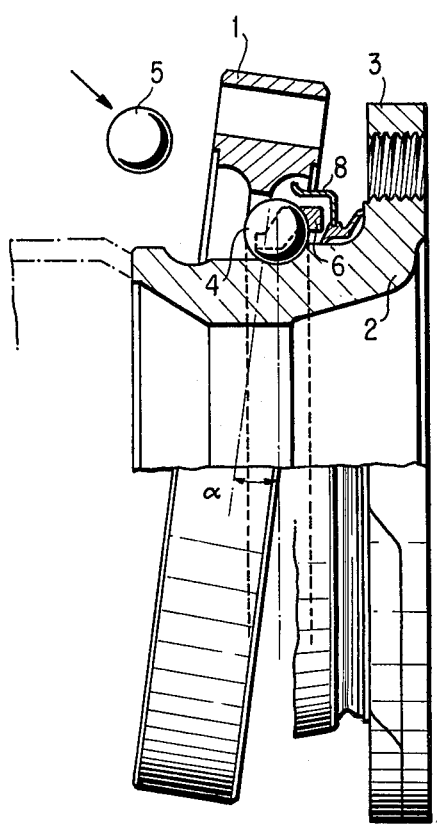
Figure 6:
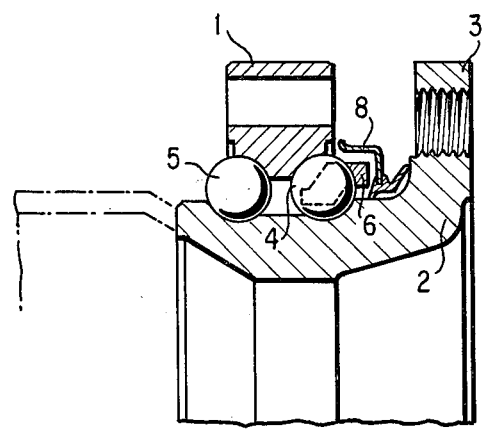
Figure 7:
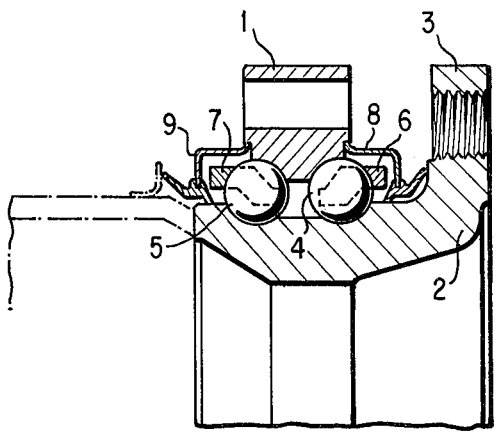

In a third step, as shown in FIG. 5, the outer race 1 is slipped over the inner race 2 and held in an off-center position, inclined at an angle $\alpha$ to the plane of the row 4 of roller elements. Next, the roller elements of the second row 5 of such elements are placed in the corresponding bearing groove of the inner race 2, and the roller elements are distributed while the inclination of the outer race 1 is reduced and the outer race 1 is moved toward the centered position, as shown in FIG. 6, before the cage 7 of the roller elements of the second row is set in place, as shown in FIG. 7.

Note that the number of roller elements in the row 5 will be less than that of the number of roller elements in the first row 4. This number, however, will be enough for very many applications, and, as a general rule, this number will be larger the smaller the separation of the bearing grooves of the outer race.

Figure 8:
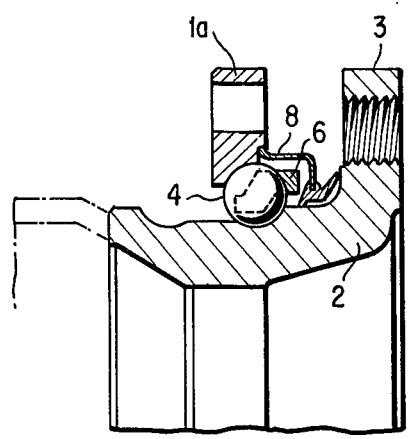
FIGS. 8 to 10 show the different steps in mounting a modification of the bearing of FIG. 1.
Figure 9:
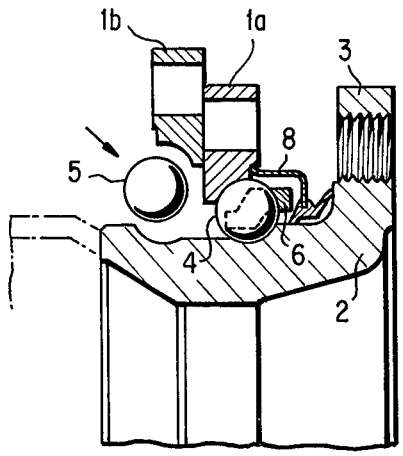
Figure 10:
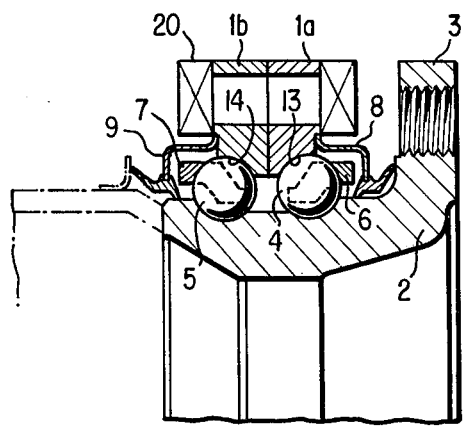

By a variation in mounting, shown in FIGS. 8 to 10, it is possible to have the same number of rolling elements in each of the two rows 4 and 5.

Thus, as shown specifically in FIG. 8, after having inserted the seal 8, one slips onto the inner race 2 a first element 1a of the outer race 1, such being formed in this embodiment in two sections, and this first element 1a carrying the groove for the rolling elements of row 4 situated on the side facing shoulder 3. Next, one slips onto the inner race 2 the second element 1b of the outer race 1, holds it in an off-center position, as shown in FIG. 9, and introduces the rolling elements of the second row 5 of such elements into the corresponding groove, while moving the second element 1b of the outer race toward a centered position. One then puts in place the cage 7 of the rolling elements of the second row 5 and fastens together, as shown in FIG. 10, the elements 1a and 1b by any suitable means 20, such as, for example, bolts, rivets, a hoop, or the like. The seals 8 and 9 are then snapped into the outer race 1, or into the elements 1a and 1b of the outer race, according to the type of bearing being provided.

When the bearing just described is incorporated in an automobile drive wheel, it is particularly advantageous to braze or glue, after assembly, the driven element 11 of the transmission coupling to the inner race 2 of the bearing. This manner of proceeding permits substantial lightening of the transmission coupling, while avoiding any special machining of the bearing race.

If it is desired to provide a bearing, such as shown in FIG. 1, with two rows of roller elements having equal numbers of balls, one could reduce the number of balls in the row 4 on the side of the shoulder 3.

Figure 11:
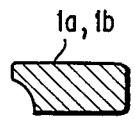
FIGS. 11 to 14 relate to the process of fabricating the outer race of the bearing described with reference to FIGS. 8 to 10.
Figure 12:
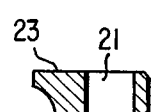

Referring now to FIGS. 11 to 14, which illustrate the process of fabricating the outer race of the bearing described with reference to FIGS. 8 to 10, one sees that the outlines of the two elements 1a and 1b of the outer race are formed by cutting or forging (FIG. 11). One then drills out holes 21 through which an assembly pin 22 passes (FIGS. 12 and 13) and proceeds onto a heat treatment and truing of the faces 23 and 24 of each race element. According to FIG. 13, one assembles the elements 1a and 1b by means of the pin 22, bringing the faces 24 thereof together, and simultaneously grinds the two bearing grooves 13 and 14 by means of a tool 25. One proceeds similarly to grind the outer diameter of the half-races. It is noted, from FIGS. 13 and 14, that one separates the two elements 1a and 1b of the race by knocking out the pin 22 and that one replaces the pin 22 by a suitable fastening means after assembling the elements 1a and 1b, in FIG. 14, with their faces 23, instead of faces 24, being together.

Obviously, many modifications and variations of the present invention are possible in light of the above teachings. It is therefore to be understood that, within the scopwe of the appended claims, the invention may be practiced otherwise than as specifically herein.

What is claimed as new and desired to be secured by Letters Patent of the United States is:

1. A bearing comprising:
   an outer race;
   an inner race having a shoulder radially extending from one side thereof to form a mounting flange;
   two bearing grooves in each of said outer and inner races;
   two holding and guiding cages of the same continuous circular configuration disposed in parallel relation between said outer and inner races;
   two sets of rolling elements arranged in parallel rows in corresponding bearing grooves of said outer and inner races and within respective ones of said two holding and guiding cages and wherein said outer race is made up of a pair of elementary races, each having one of said two bearing grooves therein, such that adjacent faces of said pair of elementary races are brought together.

2. A bearing as set forth in claim 1, wherein said two holding and guiding cages for said two rows of rolling elements are identical.

3. A bearing as set forth in claim 2, further comprising a pair of seals of similar configuration for protecting said cages for holding and guiding said rolling elements.

4. A bearing as set forth in claim 1, wherein said inner race of the bearing is brazed or glued to the driven element of a transmission coupling.

5. A bearing as set forth in claim 1, wherein said pair of elementary races include hole members and further comprises fastening means disposed within said hole members for securing said pair of elementary races together.

6. A bearing as set forth in claim 1, wherein said bearing grooves of said pair of elementary races are disposed between said two sets of rolling elements.

7. A bearing as set forth in claim 1, wherein:
   said pair of elementary races include hole members and further comprises fastening means disposed within said holes for securing said pair of elementary races together; and,
   wherein said bearing grooves of said pair of elementary races are disposed between said two sets of rolling elements.

8. A method of mounting a bearing comprising the steps of:
   mounting on an inner race a seal and cage of rolling elements of a first row on the side of the inner race with a shoulder;
   placing the rolling elements in said cage;
   slipping over the inner race, an outer race held in an off-center position and inclined to the plane of said first row of rolling elements;
   introducing rolling elements of a second row into a corresponding bearing groove and distributing these rolling elements while moving said outer race towards a centered position and reducing the inclination thereof; and
   setting in place a seal and cage of the second row of rolling elements.

9. A method of mounting a bearing comprising the steps of:
   mounting on an inner race a cage for a first row of corresponding rolling elements on a side of the inner race towards a shoulder of the inner race, then mounting the corresponding rolling elements into said cage;
   slipping over the inner race a first element of an outer race with a bearing groove on the side towards the shoulder;
   slipping over the inner race a second element of the outer race, held in an off-center position;
   placing rolling elements of a second row in a corresponding bearing groove in the inner race, while moving said second element toward its centered position so as to contact said second rolling elements;
   inserting a cage of the second row of rolling elements; and fastening together the said first and said second elements of the outer race.

10. A method of mounting a bearing comprising an outer race, an inner race having a shoulder radially extending from one side thereof to form a mounting flange, first and second bearing grooves in each of said outer and inner races, two identical holding and guiding cages of the same continuous circular configuration disposed in parallel relation between said outer and inner races, and two sets of rolling elements arranged in parallel rows in said first and said second bearing grooves of said outer and inner races and within respectively ones of said two holding and guiding cages comprising the steps of:
  mounting on the inner race a seal and cage for the rolling elements of the first row on the side of the inner race with the shoulder;
  placing the rolling elements in said cage and on said first bearing groove;
  slipping over the inner race, the outer race held in an off-center position and inclined to the plane of the said first row of rolling elements;
  introducing the rolling elements of the second row into said second bearing groove and distributing these rolling elements while moving said outer race towards a centered position and reducing the inclination thereof; and setting in place a seal and cage of the second row of rolling elements.

11. A method of mounting a bearing which comprises an outer race, an inner race having a shoulder radially extending from one side thereof to form a mounting flange, first and second bearing grooves in each of the outer and inner races, two holding and guiding cages of the same continuous circular configuration disposed in parallel relation between the outer and inner races, and two sets of rolling elements arranged in parallel rows in said first and said second bearing grooves of the outer and inner races and within respective ones of said two holding and guiding cages wherein the outer race is made up of a pair of elementary races, each having one of said first and said second bearing grooves therein comprising the steps of;
  mounting on the inner race the cage for the first row of corresponding rolling elements on the side of the inner race towards the shoulder, then mounting the corresponding rolling elements into the cage;
  slipping over the inner race a first element of the outer race with the first bearing groove on the side towards the shoulder;
  slipping over the inner race a second element of the outer race, held in an off-center position;
  placing the rolling elements of a second row of said parallel rows of rolling elements in said second bearing groove in the inner race, while moving said second element towards its centered position so as to contact said second rolling element;
  inserting the cage of the second row of rolling elements; and,
  fastening together said first and second elements of the outer race.

* * * * *